Oct. 14, 1969     H. M. SMITH     3,472,398
BALE TURNING APPARATUS
Filed Jan. 15, 1968     2 Sheets-Sheet 1
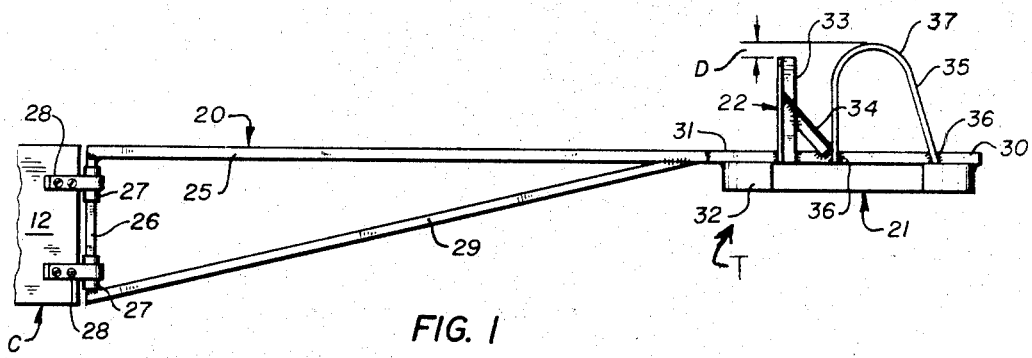
FIG. 1
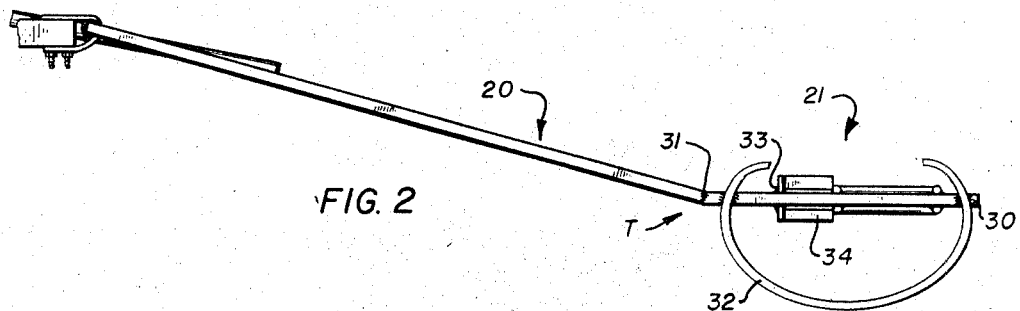
FIG. 2
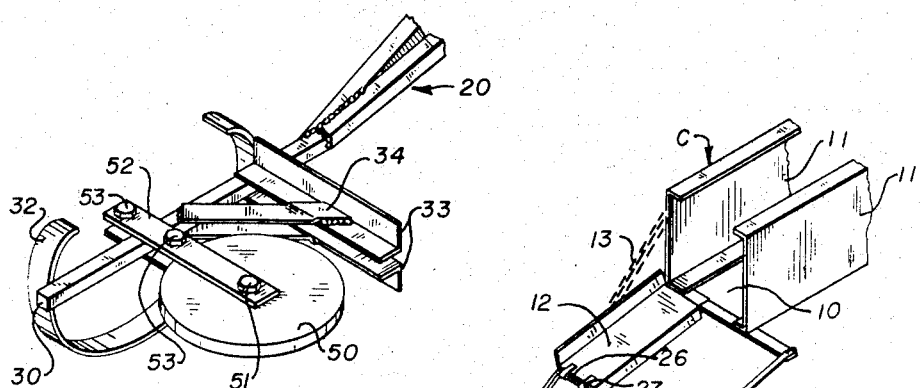
FIG. 9     FIG. 3
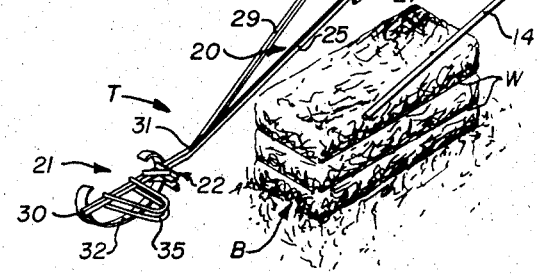
INVENTOR.
Houston M. Smith
BY
ATTORNEYS

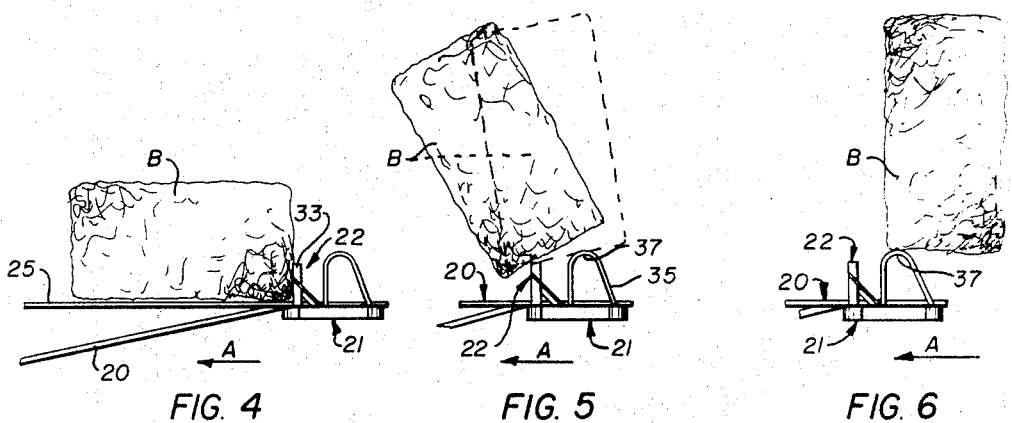
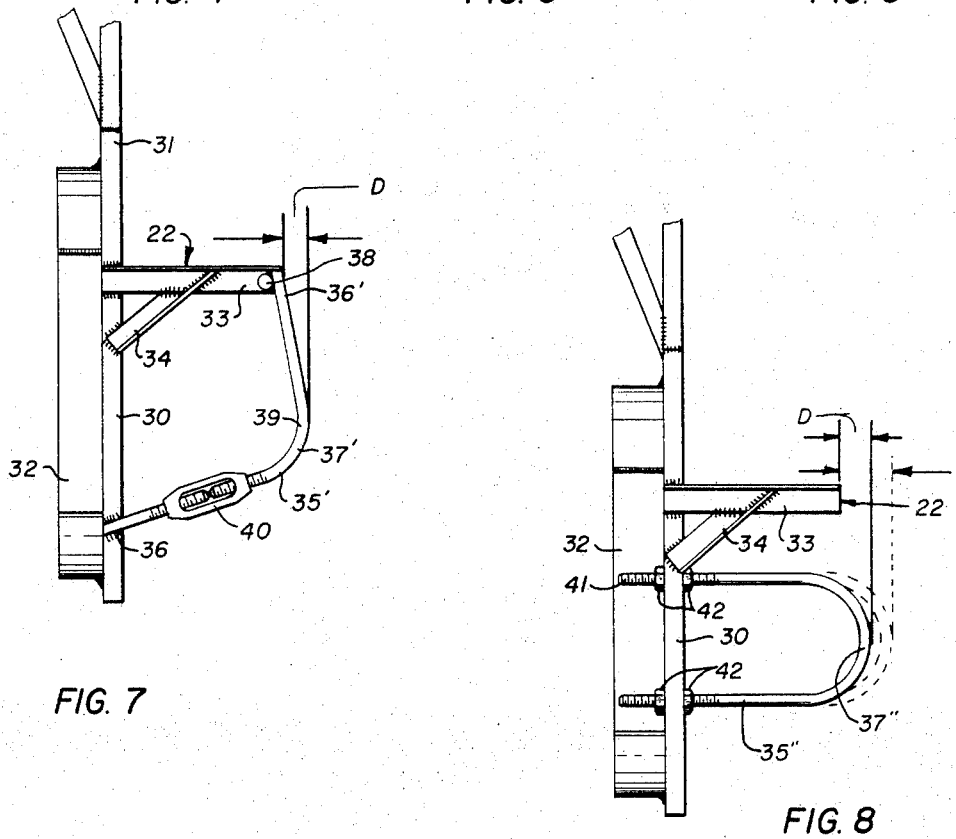

United States Patent Office 3,472,398
Patented Oct. 14, 1969

3,472,398
BALE TURNING APPARATUS
Houston M. Smith, Rte. 1, Box 121,
Fowler, Colo. 81039
Filed Jan. 15, 1968, Ser. No. 697,874
Int. Cl. B25j *11/00;* A01d *75/00*
U.S. Cl. 214—1        8 Claims

ABSTRACT OF THE DISCLOSURE

A bale turning apparatus formed as a trolley arm connected to the end of a bale forming machine to extend alongside bales dropped upon the ground by the machine. The arm carries a slide at its rearward end having an abutment adapted to contact and rotate the bales from a longitudinal to a transverse position as the bale forming machine moves away from the bale.

---

The present invention relates to apparatus for turning and aligning bales and similar articles as they are dropped from the baler onto the ground, or onto a conveyor or the like, for further handling. The invention relates more specifically to an apparatus for turning hay bales from a longitudinal alignment to a transverse alignment after they are dropped onto the ground.

One common practice for handling hay bales in the field after they have been dropped from the baler is to follow up with a bale stacking machine. This requires that the bales be aligned longitudinally with respect to the path of the baler moving across the field, that is, with their longer sides parallel to the direction of the baler movement. Accordingly, practically all balers drop the bales in the desirable longitudinal alignment to accommodate the stacking machine.

Such is not suitable, however, for the smaller farming units which cannot afford bale stacking machines, and instead, pick up the bales with fork lift trucks. A fork lift must move into the bale sidewise so that several tines will pass underneath the bale to properly support it. This requires either for the fork lift truck to move across the field crosswise to the baler path, which is not at all practical, or for a worker to follow the baler and to manually rotate each bale 90 degrees from its initial longitudinal alignment to a transverse alignment. Thus, because of the disadvantage in the manner in which bales are dropped from a baler, insofar as a fork lift pick-up operation is concerned, the present invention was conceived and developed. It comprises, in essence, a trolley secured to and extended rearwardly from the discharge chute of a baler, and a slide arm at its end which is adapted to contact and rotate the bale to the desired transverse position. Thereafter, it is easily picked up by a fork lift truck.

It follows that an object of the present invention is to provide a novel and improved apparatus which is adapted to be attached to a baler to rotate and to turn the bales from a longitudinal to a transverse alignment as they are dropped from the baler and onto the ground.

Another object of the invention is to provide a novel and improved bale turning apparatus, formed as a simple trolley-like structure adapted to be quickly and easily attached to, or removed from the discharge chute of any conventional hay baling machine.

Another object of the invention is to provide a novel and improved bale turning apparatus which may be easily adjusted to facilitate a complete 90 degree turn when rotating a bale from a longitudinal to a transverse alignment, and with a minimal variation in final alignment of one bale with respect to another.

Other objects of the invention are to provide a novel and improved bale turning apparatus which is of a very simple, low-cost construction and which is a versatile, reliable, rugged and durable unit.

With the foregoing and other objects in view, my invention comprises certain constructions, combinations and arrangements of parts and elements as hereinafter described, defined in the appended claims, and illustrated in preferred embodiments in the accompanying drawings in which:

FIGURE 1 is a plan view of the improved bale turning apparatus and of a fragment of the end of the discharge chute of a baler, to which the device is attached.

FIGURE 2 is a side elevational view of the organization shown at FIG. 1.

FIGURE 3 is a perspective view of the end of a baling chute showing a bale as being dropped therefrom and upon the ground and with the bale turning apparatus extending rearwardly and to one side of the bale and the turning arm at the end of the apparatus about to contact the bale to turn it.

FIGURE 4, 5 and 6 are fragmentary plan views of the bale turning apparatus in progressive positions as it moves past the bale, FIGURE 4 showing the bale as it is first contacted by the turning arm, FIGURE 5 showing the bale as being partially turned and FIGURE 6 showing the bale as being fully turned and the apparatus moved past the bale.

FIGURE 7 is a plan view of a somewhat modified construction of the trailing end portion of a bale turning apparatus and illustrating one manner in which certain components thereof may be varied.

FIGURE 8 is a fragmentary plan view of another modified construction of the trailing end of the bale turning apparatus.

FIGURE 9 is a fragmentary perspective view of the trailing end of the bale turning apparatus, illustrating the use of a wheel to provide a third modification of the apparatus.

Referring more particularly to the drawings, the discharge chute C at the rear end of a baling machine, as best illustrated at FIG. 3, is formed as a rectangular passageway having a floor 10 and side walls 11. This chute C is longitudinally disposed within the baling machine and a bale B formed in this machine, will pass through this chute and will be discharged therefrom to be dropped onto the ground in a longitudinal alignment with respect to movement of the baler.

The bale B of a selected, standard width is secured by wire loops W extended about the ends and opposing sides of the bale which constitute the top and bottom surfaces of the bale when it is being formed within the machine. However, it is undesirable to have the wire loops at the top and bottom surfaces when the bale lies on the ground because the wires could engage with and hook the bale onto the pick up mechanism, tines or hooks, which reach under the bale to lift it. Accordingly, the bale B is rotated about a longitudinal axis as it is dropped from the end of the baler to place the wire loops at the ends and sides of the bale when it lies upon the ground. The apparatus for so turning the bale as it falls onto the ground may be accomplished by a longitudinal half-extension 12 of the floor 10 of the chute which is disposed at one side of the chute. This extension is held by a chain 13 secured to the adjacent wall section. It follows that as a bale moves from the chute upon this half-floor extension 12, it will fall sidewise and rotate about a longitudinal axis while it is falling. An arm 14 is cantilevered from the opposite side of the baler to contact the side of the bale as it rotates to restrict the extent of its rotation and assure its being positioned in a longitudinal alignment when it is upon the ground. This apparatus is exemplified in the Patent No. 3,243,028.

The bale turning apparatus constituting the present invention is especially adapted to be used with this half-floor extension 12 and it will be described as being connected thereto. However, it is to be understood that with slight changes of proportion and minor rearrangements, the improved bale turning device can be used with any other type of bale discharge chute.

This bale turning apparatus T includes a trolley arm 20 which is pivotally connected to the rear end of the chute extension 12 to extend rearwardly therefrom and to swing in a vertical, longitudinal plane. A slide 21 is connected to the rear end of this arm 20 and a bale-contacting abutment 22 outstands from one side of the slide. In its connective arrangement upon the baler, the trolley arm 20 and the body of the slide 21 must be alongside a bale when it is dropped from the discharge end of the bale chute and to the ground. At the same time, the abutment 22 must be in a position to contact the end of the bale and rotate it in a manner hereinafter described.

The trolley arm 20 includes a main rod 25 which extends rearwardly from the chute C. A pivot rod 26 is secured to the leading end of the rod 25 to outstand normally therefrom and to be held by bearings 27 alongside the transverse end of the chute extension 12. The bearings 27 have strap-type mounts 28 which are used to fasten them in place upon the extension 12. To complete the trolley arm 20, the main rod 25 and the pivot rod 26 are reenforced and held in position by a strut 29 extending from the outer end of the pivot rod 26 diagonally to the trailing end of the main rod 25. These rods and the strut may be light-weight, tubular or channel sectioned members which are welded together and it is to be noted that where the trolley arm is mounted upon the chute extension 12, the main rod 25 will be adjacent to the inner edge of this chute extension to be alongside a bale falling therefrom.

The trolley arm 20 will normally slope downwardly in the rearward direction, with its trailing end being near the ground surface and alongside a bale after it is dropped onto the ground.

The body 30 of the slide 21 may be formed as a simple extension of the main rod 25 and this short extension is bent upwardly from the alignment of the main rod, as at bending line 31, so that the body 30 will be nearly horizontal when the trolley arm 20 slopes downwardly from the chute to place the slide 21 upon the ground.

This body portion 30, a short length of rod, is carried by a slide runner 32 formed as a half loop of metal strap to provide a curved leading edge to better slide over rough ground. This runner 32 is affixed to the side of the body 30 opposite from the abutment 22 and at a position where it will not interfere with a bale moving past the slide. It may be secured to the body rod 30 by welding or any other suitable means.

In the construction illustrated at FIGS. 1 through 6, the abutment 22 is formed as a pair of short angle bars 33 welded to the body 30, to outstand from the body. The length of these bars 33 to form the abutment 22 is such that their outer end will reach across the end of a bale a distance somewhat less than one-half the width of the bale and to impose an unbalanced force on the bale to make it rotate as will be explained. In an arrangement illustrated, one angle bar lies above and the other lies below the body bar 30 with the vertical flanges of the two angles lying in a common plane which constitutes the abutment surface 22. These angles 33 are reenforced by short diagonal struts 34 having one end affixed to the angles and the other end affixed to the body bar 30 at a point rearwardly from the connection of the abutment angles 33.

To complete this abutment structure on the slide, a pair of skid bars 35, each formed in the general shape of a U, outstand from the body bar 30 directly behind each angle 33 with the ends 36 of the U-bars 35 being welded to the body bar 30 and with one being above and one being below the bar 30. The circular crotch 37, of each skid bar 35, outstanding from the body bar 30 is thus substantially directly behind the abutment angles 33; however, it extends outwardly a short distance beyond the outward end of the angle bars 33 as indicated by the dimension D at FIG. 1. This curved crotch form is used to complete a 90 degree turn of a bale as the apparatus moves past it, as will now be explained.

FIGURES 4, 5 and 6 illustrate the manner in which a bale B is rotated, from a longitudinal position to a transverse position as the bale turning apparatus moves past it. As heretofore explained, the main rod 25 of the trolley arm 20 is longitudinally extended rearwardly to lie closely alongside a bale which will be dropped from the baler discharge chute C. The slide 21 is likewise aligned, but the abutment angle bars 33 outstanding from the slide contact the adjacent one-fourth to one-third portion of the rearward end of the bale, the standard end width of the bale being substantially greater than the extension of the bars 33. This is shown at FIG. 4 where the movement of the bale rotating apparatus is in the direction of the indicated arrow A. After contact, the abutment 22 pushes the bale outwardly away from the main rod 25 and rotates it to inclined positions as shown at FIG. 5 in solid and in broken lines. This pushing, inclining and rotating of the bale B continues about an axis defined by the outer edge of the abutment 22 until the bale contacts the circular crotch 37 of the U-shaped skid bar 35 as in the position indicated by broken lines at FIG. 5. Thereafter, further movement of the bale turning apparatus, in the direction of the indicated arrow A at FIGS. 5 and 6, pushes the bale B away from the outer edge of the abutment 22 with the circular crotch 37 of the skid sliding across the end of the bale. This sliding movement of the curved portion 37 provides for a final positioning of the bale to a transverse alignment 90 degrees from its initial alignment. It is to be noted that the effectiveness of this final positioning is controlled to some extent by the extension D, of the end of the curve 37 beyond the outer point of the abutment 22.

The skid bar 35, which comes into play whenever the bale is partially rotated about the outer corner of the abutment 22, appears to be necessary where it is desired to produce an effective and efficient turning operation. Without the curved sliding surface 37, it was found that the abutment 22 did not effectively turn the bales 90 degrees, or else it turned the bales too far, depending somewhat upon the speed of the baling machine as it moved past the bale. Moreover, the outer corner of the abutment 22 would dig into the bales and tend to tear the ends open. By providing the curve 37 a short distance outwardly of the corner of the abutment, several desirable results occurred. In the first place, the bale was lifted away from this abutment corner to avoid any tearing action and secondly, the movement of the curve sliding surface 37 across the end of the bale, places the bale in the final position shown at FIG. 6.

Simple tests are sufficient to permit the curve 37 to be properly located with respect to the outer corner of the abutment and if necessary, the skid bar 35 can be made adjustable by using certain variations in the construction of the skid 35, such as those illustrated at FIGS. 7 and 8.

In describing these modified constructions, it is to be recognized that a single angle member 33 may be used to form the abutment 22. The pair, hereinbefore described, is preferable only to provide a broader face for contacting the end of the bale. Likewise, the pair of skid bars 35, heretofore described, may be varied by using a single rod or a single flat ribbon-like member without changing the efficiency of the operation.

The construction illustrated at FIG. 7 provides for a slide 21 formed by a body bar 30, a runner 32 and an abutment 22 formed by angle bars 33 and supported by struts 34, the same as heretofore described. A single modified skid bar 35' is formed, however, by welding the rearward end 36 to the body bar 30 and extending the forward end 36' to the outer end of the abutment 22, as by a connection 38. With this arrangement, the forward portion of the curve 37' is not bent into the form of a complete U, but a reach 39 of the bar slopes from its outward position to a point near the outer end of the abutment 22. This maintains an outward extension D beyond the outer end of the abutment as heretofore described. A turnbuckle 40 is interposed in the rearward leg of this skid bar 35' to extend or to retract the length of that leg which provides for an easy and simple method of varying the dimension D as desired.

The modified unit illustrated at FIG. 8 includes the body bar 30, the runner 32, the abutment angles 33 and reenforcing struts 34, the same as heretofore described. It includes, however, a modified skid bar 35" which has its ends threaded, as at 41, to extend through suitable holes in the body 30 with lock nuts 42 at each side thereof to hold it in position. By adjustments of the lock nuts, the dimension D, the extent of the curve 37 beyond the end of the abutment 22, may be changed as in the manner indicated in broken lines. Such a change may be desirable when the speed of the baler is varied or when the apparatus is used on a machine for turning bales of a different size.

The modified unit illustrated at FIG. 9 includes the body bar 30, the runner 32, the abutment angles 33 and reenforcing struts 34, the same as heretofore described. In lieu of the skid bar, however, it provides a horizontally disposed deflector wheel 50 mounted on a pivot bolt 51. The bolt 51 is carried between two bars 52 which extend to the body bar 30 and lie above and below it. The bars 52 are secured to this body bar by bolts 53, at each side of the bar 30, which are spaced apart a distance sufficient to permit the position of the wheel 50 to be adjusted with respect to the outer corner of the abutment angles 33. In this arrangement, the end of the bale strikes the rim of the wheel as the bale is being turned from a longitudinal to a transverse position.

I have now described my invention in considerable detail. However, it is obvious that others skilled in the art can build and devise alternate and equivalent constructions which are nevertheless within the spirit and scope of my invention.

I claim:
1. A bale turning apparatus adapted to rotate a bale of a selected end width, from a longitudinal to a transverse position after the bale is deposited rearwardly from the chute of a moving bale forming machine to lie upon the ground in a longitudinal position with respect to the direction of movement and comprising:
   (a) a trolley arm attached to the baling machine to extend rearwardly therefrom and including a main rod extending rearwardly and closely alongside a bale when dropped from the baling chute;
   (b) a slide at the rear end of the trolley arm formed as an extension of a portion of the main rod and a runner means adapted to support the slide a selected height above the ground surface;
   (c) a bale contacting abutment immovably mounted on and transversely outstanding from the slide a distance less than one-half the aforesaid bale end width, said contact abutment having a flat surface member lying in a vertical plane with the outer edge thereof being vertical to define a vertical axis about which the bale rotates when the apparatus contacts and moves past a bale; and
   (d) a skidding means outstanding from the slide behind the abutment having a surface portion outstanding beyond the end of the abutment to contact the end of the bale as it is being rotated about the outer edge of the abutment and approaches a transverse position, whereby to pull the end of the bale away from the abutment and align it to a transverse position as the skidding means moves past the end of the bale.

2. In the organization defined in claim 1, wherein:
the trolley arm is pivotally connected to the end of the baling machine to permit the same to swing in a vertical plane longitudinal to the movement of the baling machine.

3. In the organization defined in claim 1, wherein said skidding means comprises:
a U-shaped bar with a curved crotch portion outstanding from the body immediately behind the abutment, having its ends mounted onto the body and the crotch portion outstanding therefrom to extend laterally a short distance beyond the end of the abutment.

4. In the organization defined in claim 1, including:
a pivot rod at the leading end of the main rod and
a bearing on the end of the baler adapted to hold the pivot rod, and
a reenforcing strut interconnecting the pivot rod and the trailing end of the main rod adapted to reenforce the main rod against lateral pressure as the bale is being rotated.

5. In the organization defined in claim 1, wherein said abutment comprises:
a pair of angle members secured to the body member, with one angle being positioned above and the other angle being positioned beneath, the main body member and with the surfaces of the angles being in a common vertical, transverse plane.

6. In the organization defined in claim 1, wherein said skidding means comprises:
a curved bar having the rearward end connected to the body behind the abutment and the forward end connected to the abutment at a point near its outer end with the curved portion extending a short distance outwardly beyond the end of the abutment, and
a turnbuckle means is formed in the rearward portion of the bar adapted to vary its length.

7. In the organization defined in claim 1, wherein:
said skidding means is secured to the body by an adjusting means whereby to vary the outward distance of the skidding means with respect to the abutment.

8. In the organization defined in claim 1, wherein the skidding means comprises:
a horizontally disposed wheel, and a wheel supporting means secured to the body behind the abutment to extend the wheel to a position laterally of the body directly behind the abutment.

References Cited

UNITED STATES PATENTS

| | | |
|---|---|---|
| 2,408,863 | 10/1946 | Lisota. |
| 2,543,302 | 2/1951 | Rossiter. |
| 2,792,136 | 5/1957 | Abbott. |

GERALD M. FORLENZA, Primary Examiner

F. E. WERNER, Assistant Examiner